W. P. & S. G. THOMSON.
RAILWAY TIE.
APPLICATION FILED JUNE 25, 1907.
1,105,720.
Patented Aug. 4, 1914.
4 SHEETS—SHEET 1.
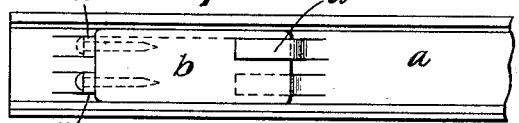
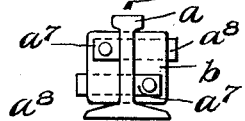
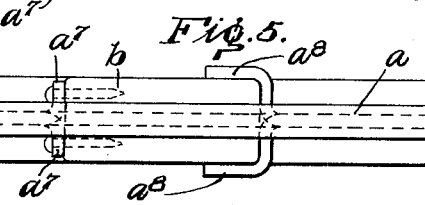
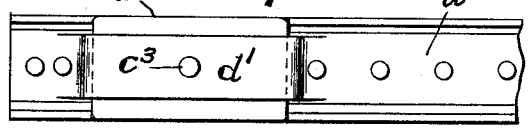
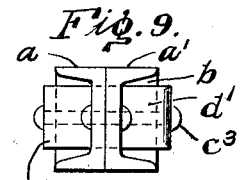
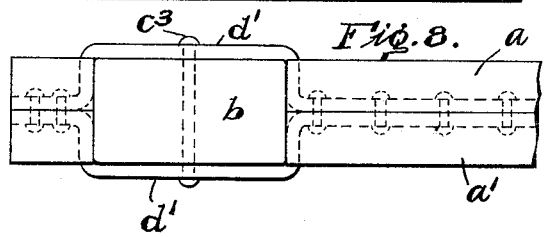
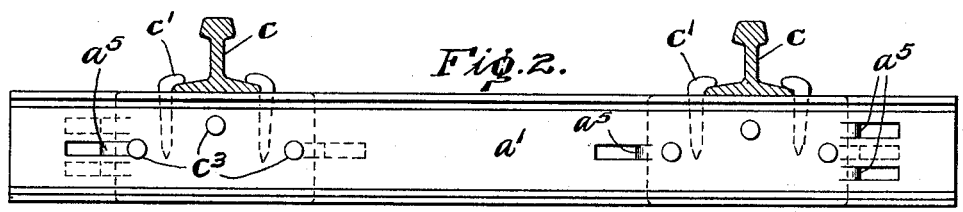
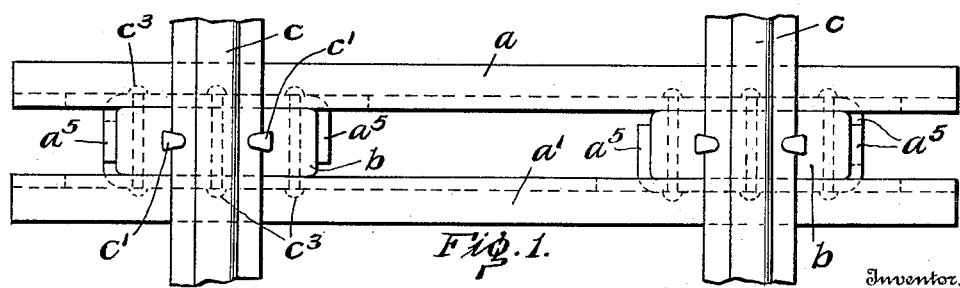
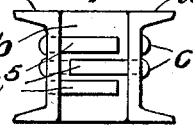

W. P. & S. G. THOMSON.
RAILWAY TIE.
APPLICATION FILED JUNE 25, 1907.
1,105,720.
Patented Aug. 4, 1914.
4 SHEETS—SHEET 2.
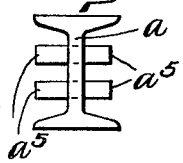
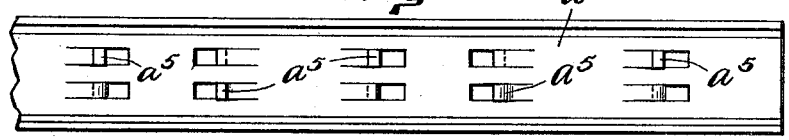
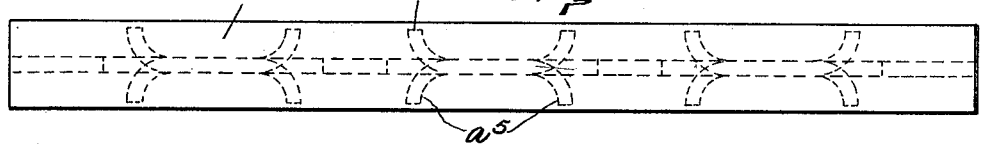
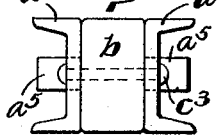
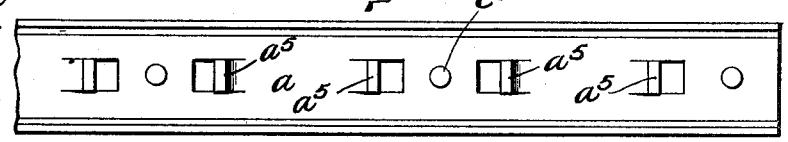
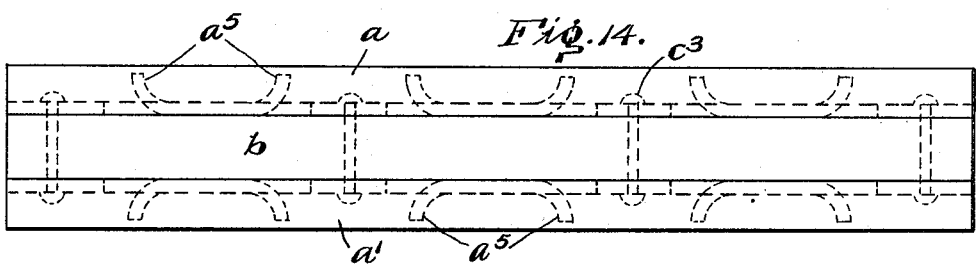
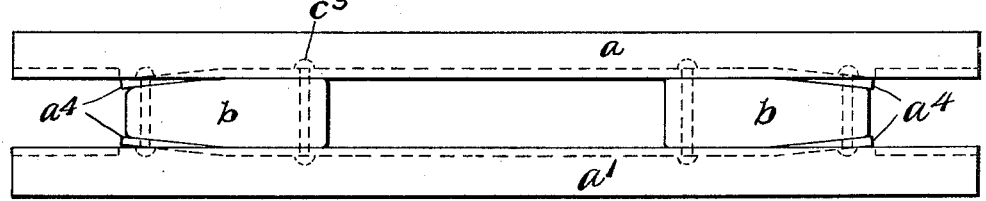
Witnesses
Danl. Webster, Jr.
N. F. Driscoll.
Inventor
Wm. P. Thomson and
S. G. Thomson
By
Attorney

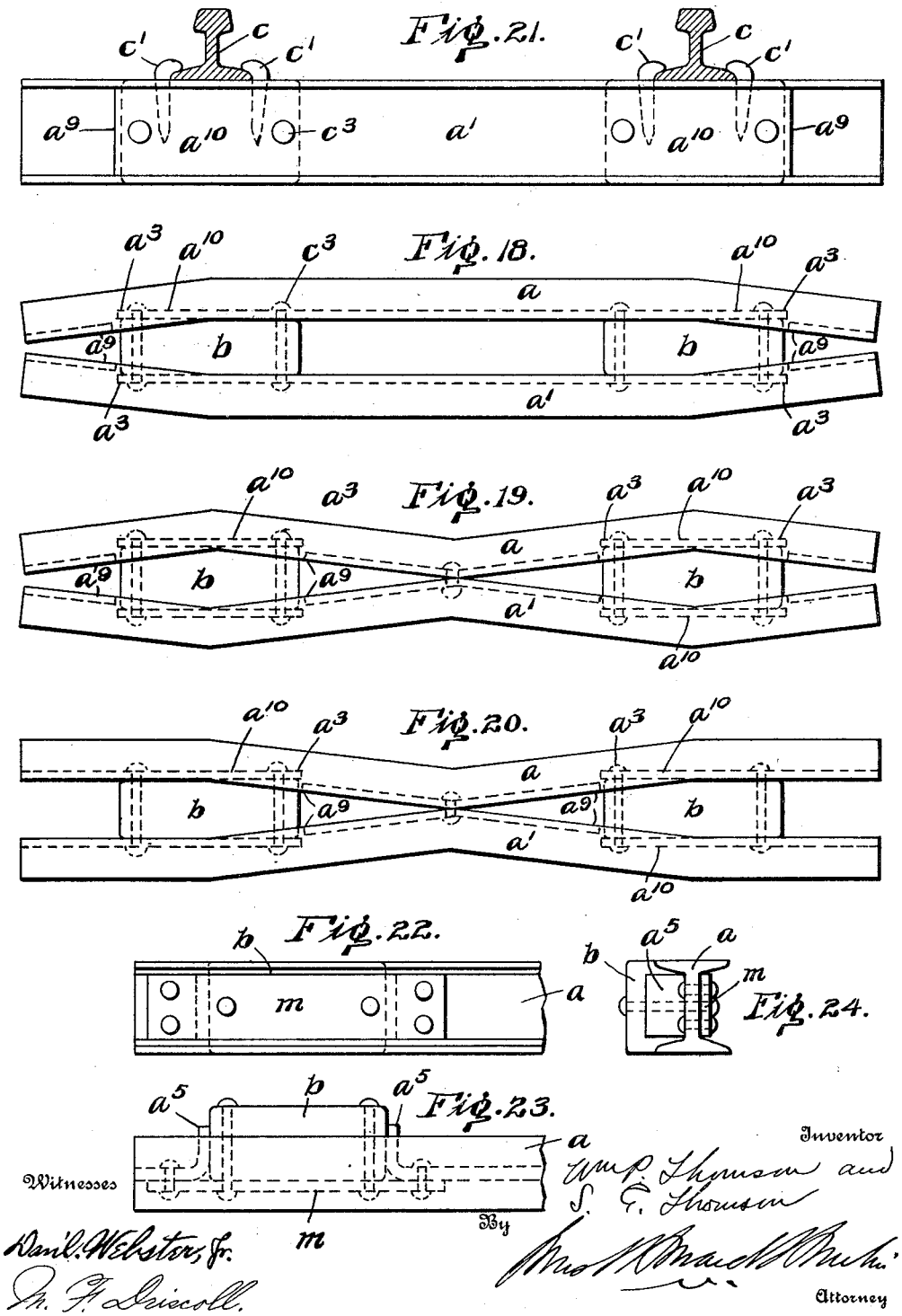

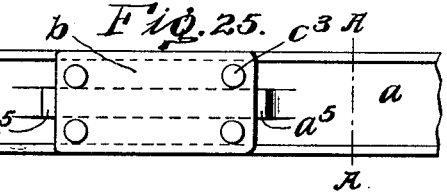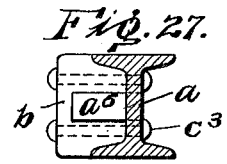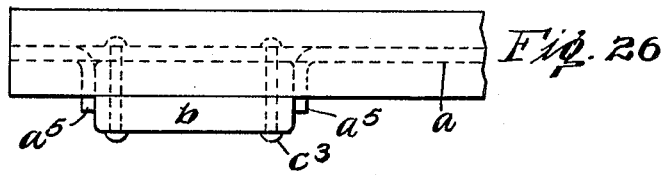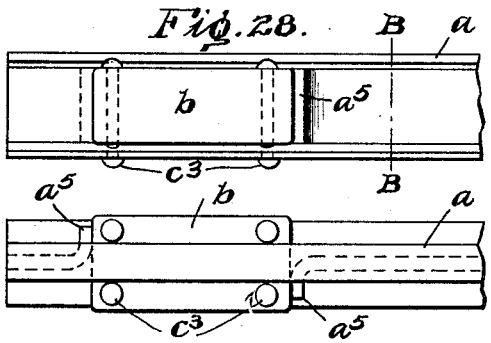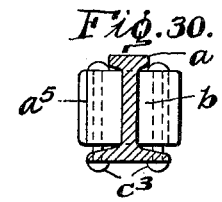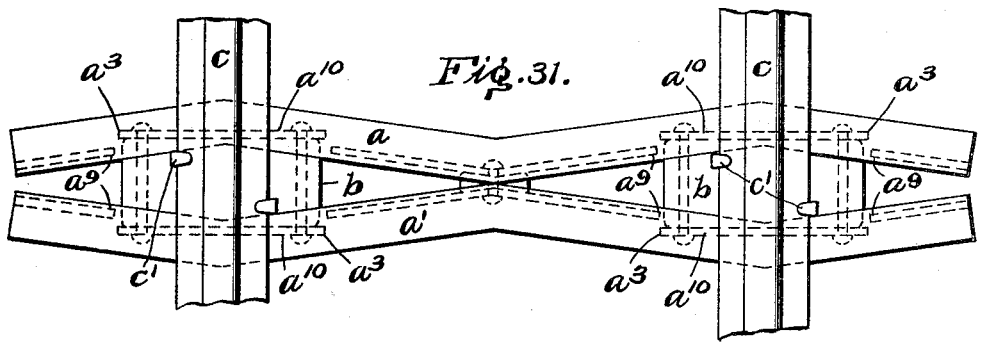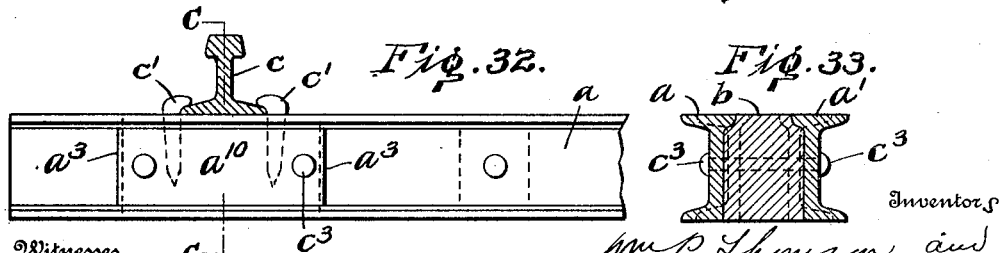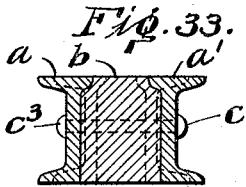

UNITED STATES PATENT OFFICE.

WILLIAM P. THOMSON AND SAMUEL G. THOMSON, OF PHILADELPHIA, PENNSYLVANIA.

RAILWAY-TIE.

1,105,720.

Specification of Letters Patent. Patented Aug. 4, 1914.

Application filed June 25, 1907. Serial No. 380,651.

*To all whom it may concern:*

Be it known that we, WILLIAM P. THOMSON and SAMUEL G. THOMSON, residents of the city and county of Philadelphia, State of Pennsylvania, have invented an Improvement in Railway-Ties, of which the following is a specification.

This invention relates to a railway tie comprising a metallic member which extends from rail to rail and is provided with lateral projections extending outwardly from the web. Such lateral projections when embedded in the ballast or material of the road-bed will act as a means to hold the tie as an entirety against longitudinal movement.

Our invention also relates to that class of railway ties which are made up of one or more metallic members and of wooden blocks or members secured to said metallic members and extending under the rail bearings. In this case the lateral projections extending outwardly from the web of the metal member or members are also employed as a means for securing the wooden blocks or members in place and preventing longitudinal displacement. It is of the greatest importance in ties of this character that the wooden blocks should be held firmly against longitudinal movement and it is one of the results of our construction that the lateral projections of the web will form bearings or stops for the ends of the blocks and will relieve the rivets or bolts of the strain to which they would otherwise be subjected.

Our construction also enables rectangular blocks to be used with certain forms of metallic members with which they could not otherwise be employed, and thereby a greater spiking area is obtained.

In the drawings: Figure 1 is a plan view of one form of a railway tie embodying the invention; Fig. 2 is a side elevation of the same; Fig. 3 is an end elevation; Figs. 4, 5 and 6 are respectively a side elevation, plan view and end elevation of one end of a tie illustrating another form; Figs. 7, 8 and 9 are respectively a side elevation, plan view and end elevation of another form; Figs. 10, 11 and 12 are similar views of a different form; Figs. 13, 14 and 15 are similar views of a still different form; Figs. 16, 17, 18, 19 and 20 are plan views of other forms; Fig. 21 is a side elevation of the form of tie shown in Fig. 18; Figs. 22, 23 and 24 are respectively a side elevation, plan view and end elevation of a further modification; Figs. 25 and 26 are respectively a side elevation and plan view of another modification; Fig. 27 is a transverse section on the line A—A of Fig. 25; Figs. 28 and 29 are respectively a side elevation and plan view of a further modification; Fig. 30 is a transverse section on the line B—B of Fig. 28; Fig. 31 is a plan view of the form shown in Fig. 19 illustrating the spiking of the rails to the blocks; Fig. 32 is a side elevation of one end of the same; and Fig. 33 is a vertical section of the same on the line C—C of Fig. 32 with the rail omitted.

$a$ $a'$ are the metal members of the tie which are of a length sufficient to extend under both rails. In some cases, as in the constructions shown in Figs. 4, 5 and 6, 10, 11 and 12 and 22, 23 and 24, 25, 26 and 27, and 28, 29 and 30, but a single continuous metal member $a$ spanning the rails is used, while in other cases, as in the constructions shown in the other figures, two metal members $a$ $a'$ are used. These members $a$ $a'$ may be of any construction, but we prefer to use flanged structural iron, the particular section employed depending on the character of the road-bed and other engineering conditions.

$b$ are the wooden blocks or members which are secured to the metal member or members at the rail bearings and may act as blocks for securing the rails $c$ and also as elastic rail rests. It has been proposed to secure such blocks to the metallic member or members by means of clamps, bolts or rivets, such fastenings alone acting as the means for holding the blocks or members in place. It is a feature of the present invention that a portion or portions of the metal member or members shall be bent or forced out of their natural lines for the purpose of forming means for securing the blocks or members $b$ in place.

In the form shown in Figs. 1, 2 and 3, in which the tie consists of two parallel metallic members $a$ $a'$ between which the blocks $b$ $b$ are secured at the rail bearings, tongues $a^5$ are cut in the vertical webs of the members $a$ $a'$ and are bent out over the ends of the blocks. In the construction shown each member is provided at one outer end with two tongues $a^5$ for the outer end of one block and a single tongue for the inner end of said block, while the other end of the member is provided with a single tongue for the outer end of the other block. The members $a$ $a'$ are so assembled that the block $b$ at each end will be embraced at the outer end by the two tongues $a^5$ $a^5$ of one member and by the single tongue of the other member, and at its inner end the block will be embraced by the single tongue of one member. The advantage of this particular arrangement of the tongues is that it provides a strong brace for the block without materially weakening the webs of the metal members and affords the greatest support at the outer end where it is chiefly desired to resist the tendency of the blocks to spread apart. The blocks may be secured to the webs of the members $a$ $a'$ by bolts or rivets $c^3$.

In the construction shown in Figs. 4, 5 and 6 a single metal member $a$ is employed; the web is cut out to form an opening in which the block $b$ is inserted and tongues $a^7$, $a^8$ of the web secure the block in place. In this case one end of the block is spiked or secured to the tongue $a^7$ while the tongues $a^8$ are bent about the other end.

In the construction shown in Figs. 7, 8 and 9 the metal member is formed of two channel irons $a$ $a'$ fastened together, having the flanges cut out at the points where the block is inserted and the vertical webs stamped out to form yokes $d'$ embracing the block, one on each side. The block is inserted in the opening formed by these yokes and may be secured by a transverse rivet or rivets $c^3$ as shown. It will be noted that in this form the rail base will rest directly on the block which thus forms the rail bearing as well as the means of fastening the rail to the tie.

In the forms shown in Figs. 16, 17, 18, 19, 20 and 21, the body of the tie consists of two metallic members $a$ $a'$ between the vertical webs of which the blocks are inserted and said webs are cut and bent forward at either or both ends to bring the metal faces in contact with the sides of the block, and the block is secured to said faces by rivets $c^3$. In the forms shown in Figs. 16 and 17 the sides of the blocks $b$ are not straight and the web is cut and bent forward as at $a^4$ to meet these faces and form means, in addition to the rivets or clamping devices, for holding the blocks against longitudinal displacement.

In those forms shown in Figs. 18, 19, 20 and 31 in which the metallic members are bent toward one another at the rail bearings (which is a very desirable form of tie for certain conditions) it will be noted that the cutting and bending back of the web portions $a^3$ provides flat bearing faces $a^{10}$ for the blocks and thus enables rectangular blocks $b$ to be used, which would not otherwise be possible. This affords a larger spiking body and insures the driving of the spikes into the body of the block at a distance from the edges. It will be noted that the blocks when secured to the bearing faces $a^{10}$ will lie partly under the top flanges of the members $a$ $a'$ adjacent to the rail bearings, so that the spikes which are driven adjacent to the edges of the top flanges extending over the outer edges of the blocks must pass well within the body of the blocks. This is very clearly shown in Fig. 31. In these forms the end or ends of the block at the bent portions $a^3$ will extend outside of the uncut ends $a^9$ of the body of the web and those uncut ends will therefore act as means, additional to the rivets, to hold the blocks against longitudinal movement.

In the construction shown in Figs. 22, 23 and 24 a single metallic member $a$ is employed, the web of which is cut and bent to form tongues $a^5$ extending over the ends of the block $b$, and a separate plate $m$, to which the block is secured, extends across the opening in the web formed by cutting and bending out the tongues $a^5$, and is riveted to the two portions of the web.

In the form shown in Figs. 25, 26 and 27 the block $b$ is arranged on one side only of the metallic member and is riveted directly to the web, from which small tongues $a^5$ are cut and bent out to embrace the ends of the block.

In the form shown in Figs. 28, 29 and 30, an opening is cut in the web and the block is inserted in this opening so as to extend on each side of the member $a$. In this case the block is riveted to the base flange of the member $a$ and the tongues $a^5$ are bent out oppositely at the ends of the block.

The form shown in Fig. 31 is similar to that shown in Fig. 19, with the addition of the rails $c$ $c$ and the rail spikes $c'$. This view illustrates the manner in which the inclined flanges of the members $a$ $a'$ extend over the tops of the blocks $b$ $b$ and act as guides to insure the spikes $c'$ being driven into the body of the blocks at a distance from the outer edges.

In all of the forms that have been described the portion or portions of the metal member which have been cut, bent or forced out of the natural lines have been used as a means for securing the wooden members or blocks in place; in addition to this function, however, they also act as a means for holding the tie as an entirety against longitudinal movement when they are embedded in the ballast or material of the road-bed; and our invention includes a tie having such bent or deformed portions when used for this purpose alone without any wooden members or spiking blocks. This form of our tie is shown in Figs. 10, 11 and 12; here the metal member is used alone, and the tongues $a^5$ are cut and bent out to form spurs or irregularities in the length of the tie. We have shown such tongues bent out on both sides but it is apparent that they may be used on one side only.

In some cases also it is desirable to use a continuous wooden member $b$ extending from rail to rail through the central portion, instead of separate blocks $b\ b$ at the rail bearings only. A tie of this character is shown in Figs. 13, 14 and 15 in which the continuous wooden block is riveted between the vertical webs of two metal members $a\ a'$, and the tongues $a^5$ are cut and bent outward from the webs to form the retaining projections or irregularities.

The various forms which have been shown are intended to meet the different engineering conditions, such as the nature of the road-bed and the character of the traffic. With a soft bed where a wide footing is desired under the rails such forms as are shown in Figs. 1, 18, 19, 20 and 31 are especially suitable; where an all metal footing is desired it may be had with ties of the forms shown in Figs. 6, 12 and 30; in forms such as are shown in Figs. 3, 15, 16, 17, 18, 19, 20, 24, 27 and 33, the rail bearing may be composed partly of metal and partly of wood; in the forms shown in Figs. 6 and 12 they are of metal only, and in the form shown in Fig. 7 of wood only.

Many other variations may be made in the forms of the ties without departing from our invention, provided the essential feature of the deformation of the tie in its length by the cutting or bending of portions of the web is retained, whether those cut or bent portions be employed as means to hold the tie as an entirety against longitudinal movement in the road-bed, or also as means for holding the wooden members or blocks in place when such wooden members are used.

When we speak of the block or member $b$ as a "wooden" block or member, it is to be understood that we mean to include a block or member of composition or other suitable material which may be used as a fastening member or as an elastic rail bearing.

What we claim is as follows:

1. A railway tie having two separate metallic members extending from rail to rail, said members having upright webs from which projections are displaced to extend laterally and form abutments for the upright outer faces of spiking blocks against only one of the upright faces of each of said projections.

2. A railway tie having two separate metallic members extending from rail to rail, said members having horizontal top flanges and having portions of their webs bent out of alinement to form upright bearing faces for engaging the upright outer faces of spiking blocks.

3. A railway tie having two separate metallic members extending from rail to rail, one of said members having an upright web from which a portion is cut loose and bent out of alinement to form an abutment on only one of its faces for engaging the upright outer face of a spiking block.

4. A railway tie having spiking blocks and a horizontally flanged metallic member with an upright web extending from rail to rail, said metallic member having a portion of said web forced out of alinement to form an upright bearing face on only one of its sides for one of said spiking blocks, said block contacting on its bottom with the road-bed and having an upright outer face abutting against said bearing face.

5. A railway tie having a metallic member extending from rail to rail with a horizontal flange extending along its top, and a wooden member lying entirely below the top face of said horizontal flange and secured to integral portions displaced from the web of said metallic member.

6. A railway tie having a metallic member with an upright web extending from rail to rail, and with a horizontal flange along its top, and a wooden member having one of its upright outer faces abutting against an integral portion displaced from said web to project laterally, said lateral projection holding said wooden member against longitudinal displacement.

7. A railway tie having a metallic member with a horizontal top flange and a vertical web, and a fastening block secured beneath the rail and having an upright outer face abutting against an integral portion of said web, said portion being displaced from its original alinement.

8. A railway tie having a metallic member with a vertical web extending from rail to rail, and a block secured to one side only of said web, said web having displaced portions to engage said block, and means for holding said parts together.

9. A railway tie having a metallic member extending from rail to rail, said member having a horizontal flange along its top and having a portion of its web forced out of alinement to form a bearing face, and a wooden block secured to said bearing face.

10. A railway tie having a metallic member extending from rail to rail, and wooden blocks, said metallic member having a web from which a portion at each end at the rail bearing section of the tie is forced out of alinement, each of said portions forming a bearing on only one of its sides for one of said blocks which contacts on its bottom face with the road-bed, and means for securing said parts together.

11. A railway tie having separate metallic members extending from rail to rail, said members having upright webs from which projections are displaced to extend laterally adjacent to the rail bearings, blocks fastened to said metallic members and having their outer ends abutting against only one side of each of said projections, and means for securing said parts together.

12. A railway tie having an upright metallic member extending from rail to rail, and a wooden spiking block arranged to have a portion of its bottom face contact with the road-bed, said block abutting on an outer face against an upright face of a portion of said metallic member forced out of alinement adjacent to the rail bearing.

13. A railway tie having a horizontally flanged metallic member with a portion displaced from its regular alinement, and a wooden spiking block underlying said horizontal flanges and occupying a portion of the space afforded by said displacement.

In testimony of which invention, we have hereunto set our hands.

W. P. THOMSON.
S. G. THOMSON.

Witnesses:
ERNEST HOWARD HUNTER,
R. M. KELLY.

Copies of this patent may be obtained for five cents each, by addressing the "Commissioner of Patents, Washington, D. C."